United States Patent Office 3,639,489
Patented Feb. 1, 1972

3,639,489
METHOD FOR PREPARING HEXACHLOROPHENE
Edwin B. Michaels, Gregory Court,
East Norwalk, Conn. 06855
No Drawing. Continuation-in-part of application Ser. No. 644,476, June 7, 1967. This application Feb. 6, 1968, Ser. No. 703,257
Int. Cl. C07c 39/16, 37/00
U.S. Cl. 260—619 A                10 Claims

ABSTRACT OF THE DISCLOSURE

A novel process is provided for preparing hexachlorophene by admixing a lower alkyl monocarboxylic acid or the anhydride thereof with 2,4,5-trichlorophenol either in its pure or technical form and, thereafter, condensing the same with both a formaldehyde-yielding substance and an acid-condensing agent, said reactants and adjuvants being present in critically recited proportions.

This application is a continuation-in-part of my co-pending application, Ser. No. 644,476, filed on June 7, 1967, now abandoned.

The present invention relates to an improved process for the preparation of the widely employed germicide, bis-(3,5,6-trichloro-2-hydroxyphenyl) methane, hereinafter termed "hexachlorophene." More particularly, it relates to a process for preparing hexachlorophene from the condensation of 2,4,5-trichlorophenol, an acid condensing agent and a formaldehyde-yielding substance, in the absence of an halogenated hydrocarbon menstruum. Still more particularly, it relates to an improved process for preparing hexachlorophene directly by condensing, in the presence of hereinafter defined proportions of (a) 2,4,5-trichlorophenol either in its pure or impure form, (b) a lower alkyl monocarboxylic acid or the anhydride thereof, such as acetic acid or its anhydride, (c) an acid condensing agent, such as oleum, concentrated sulfuric acid or mixtures thereof, and (d) a formaldehyde-yielding substance, such as formaldehyde, whereby there is recovered insolubilized hexachlorophene in good yield and purity.

In the past, several methods have been reported for preparing and recovering hexachlorophene from a reaction menstruum. One widely accepted procedure involves the use of halogenated hydrocarbons, such as perchloroethylene, chloroform or carbon tetrachloride, to effect concentrated sulfuric acid condensation of substantially pure 2,4,5-trichlorophenol with paraformaldehyde in a non-aqueous medium. Unfortunately, this method is not wholly satisfactory, since it requires the use of rather expensive halogenated hydrocarbon solvents as well as extensive subsequent processing in the recovery of desired hexachlorophene involving steam distillation. A second method avoids steam distillation. In that method there is employed a recrystallization solvent, such as benzene or methanol. This procedure requires repeated recrystallizations to recover hexachlorophene and, therefore, is both time consuming and costly. If a procedure could be found which would obviate these and other difficulties of the prior practice, such would fulfill a long-felt need in the art.

It is, therefore, a principal object of the invention to provide an economical process for effecting the condensation of 2,4,5-trichlorophenol with a suitable acid condensing agent and an aliphatic aldehyde in the presence of a lower alkyl monocarboxylic acid, the anhydride thereof or a mixture of each.

It is a further object of the invention to effect both the solubilization of 2,4,5-trichlorophenol in the presence of a lower alkyl carboxylic acid, its anhydride, or mixtures thereof and the reaction of the latter mixture with an acid condensing agent and formaldehyde, all being present in hereinbelow critically defined proportions, whereby hexachlorophene is produced directly and readily precipitated from the reaction medium.

Other objects and adavntages will become apparent from a consideration of the ensuing description.

To this end, it has been unexpectedly found that a lower alkyl monocarboxylic acid adjuvant enhances the condensation of pure (99%–100%) or substantially pure, that is technical grade (85%–96%), 2,4,5-trichlorophenol with a formaldehyde-yielding material in the presence of an acidic condensing agent, such as oleum, concentrated sulfuric acid, or mixtures of the latter, so as to obtain hexachlorophene in good yields and purity. Surprisingly, the aforementioned lower alkyl monocarboxylic acid adjuvant does not adversely affect the condensation reactions, but materially aids in hexachlorophene formation and recovery in good yields and purity.

According to the process of the invention, there is initially dissolved or solubilized, either pure or impure grade, 2,4,5-trichlorophenol in an acidic adjuvant, such as formic acid, acetic anhydride, acetic acid, propionic acid or mixtures of the same, and heating the mixture to a temperature between about above 80° C. and below 120° C., preferably between 90° C. and 100° C. The latter temperature is maintained during the addition of an acid condensing agent, followed by the further addition of a formaldehyde-yielding substance. The temperatures of the reaction mixture is next held at between about 85° C. and about 100° C. for from about one to about four hours to insure completion of the reaction. During this reaction period, a reaction product separates from the solution as a granular solid which is usually purified by known procedures. For instance, there is added to the latter granular solid any suitable sufficient alkaline solution until a pH of from about 12 to about 13.5 is attained. Occluded acidic condensing agent, such as sulfuric acid therein, is neutralized. Resultant solubilized mixture is next acidified with a suitable reagent, such as sulfuric acid or sodium bicarbonate, to attain a pH between about 9.5 and about 10. So-formed salt of hexachlorophene precipitates out of the latter solution wherein dissolved impurities remain undisturbed therein. Separating and acidifying the latter salt, substantially white crystals of hexachlorophene in yields ranging from 85% to 90%, or higher, having a melting point between 161° C. and 168° C. are obtained.

In an alternative embodiment of the process of the invention, the lower alkyl monocarboxylic acid-solubilized 2,4,5-trichlorophenol can be initially admixed with a formaldehyde-yielding substance simultaneously with, or followed by, the introduction of oleum or concentrated sulfuric acid, so as to prepare hexachlorophene. As hereinabove indicated, the overall reaction is carried out between above 80° C. and 120° C. for from one to four hours to insure completion of the reaction. Advantageously, the overall process of the invention does not require, as does the prior practice, the initial use of halogenated hydrocarbon solvents. In so proceeding, there is avoided extensive halogenated solvent recovery, whereby significant savings in both time and treasure are obtained.

It is of critical importance in the process of the present invention to incorporate the lower alkyl carboxylic acid, condensing agent and the formaldehyde-yielding substance within well defined proportions with respect to the trichlorophenol reactant while maintaining the reaction above 80° C. but below about 120° C. Otherwise, not only are commercially acceptable yields of hexachlorophene unattainable, but an acceptable grade of hexachlorophene having a melting point between above 160°

C. and 166° C. cannot be prepared. In this regard, it has been unexpectedly found that for each 100 parts by weight of the trichlorophenol employed, there are critically reacted therewith the following:

(a) from about 25 to less than 100 parts of lower alkyl carboxylic acid adjuvant,
(b) from 100 to 200 parts, or more, of the acid-condensing agent, and
(c) from 8 parts to about 9 parts of the formaldehyde-yielding substance, such as formaldehyde or paraformaldehyde.

The amounts of additives are all interrelated, since an amount without the indicated range adversely affects yield and quality of product recovered.

In general, it is a good practice of the invention to dissolve 100 parts, by weight, of 2,4,5-trichlorophenol in from 25 to 85 parts, by weight, of acetic acid or acetic anhydride, or a mixture thereof, and to heat resultant mixture to a temperature of about 82° C. To this mixture are added 100 parts, by weight, or sulfuric acid having a concentration between 90% and 120%, while maintaining the temperature of the resultant mixture at from 90° C. to 100° C., and from 8 to 9 parts, by weight, of a formaldehyde-yielding substance, such as paraformaldehyde and formaldehyde, for from one hour to two hours.

To further clarify an understanding of the invention, the following examples are given for purposes of illustration and are not to be construed as limiting in any way the scope of the invention. All parts presented herein are by weight except as otherwise stated.

EXAMPLE 1

To a suitable reaction vessel are added 100 parts of 95% technical grade 2,4,5-trichlorophenol having a crystallizing point of 60° C. and 75 parts of acetic acid. The mixture is heated to 82° C. The temperature was next increased to 95° C. for a period of about 30 minutes during which time 125 parts of concentrated sulfuric acid under agitation are added. To the latter are then gradually added over a one hour period 8.5 parts of paraformaldehyde while maintaining the temperature at between 90° C. and 100° C. The temperature of the resultant mixture is held at about 90° C. for an additional one and one-half hours. On dilution with 100 parts of water and subsequent filtration, there is recovered 101 parts of hexachlorophene possessing a melting point equal to about 160° C.

The recovered hexachlorophene is next heated at 95° C. with an aqueous (solution) of 2% sodium carbonate and 5% sodium hydroxide to form the di-sodium salt of hexachlorophene along with small amounts of impurities at a pH of about 13.5 and filtered. There is next added sufficient sulfuric acid (98%) to reduce the pH to about 10, whereby the mono-sodium salt of hexachlorophene precipitates out of solution leaving any impurities solubilized therein. Upon separation of the salt from the latter solution by filtration, the salt is next digested at 95° C. in an aqueous sulfuric acid solution to regenerate purified hexachlorophene, which upon water washing and drying yields 92% of a white powdery hexachlorophene, having a melting point between 163° C. and 166° C.

EXAMPLE 2

The procedure of Example 1 is repeated in every detail except that 50 parts of acetic acid and a mixture of 50 parts of concentrated sulfuric acid and 75 parts of oleum are employed, whereby there is obtained a yield of 93.0 parts, equivalent to 90% of the theoretical, of white crystals of hexachlorophene, melting at 162° C.–165° C.

Substituting propionic acid for acetic acid in the above example, similar results are attained.

EXAMPLE 3

The procedure of Example 1 is repeated in every detail except that acetic acid is omitted. No detectable yield of hexachlorophene per se is obtained.

EXAMPLE 4

A mixture of 25 parts of acetic acid and 100 parts of substantially pure (99.5%) 2,4,5-trichlorophenol dissolved in 225 parts of ethylene dichloride is added to a suitable reaction vessel. Resultant solution is next heated to a temperature of between 85° C. and 90° C. while gradually adding 44.5 parts of 20% oleum and 9 parts of paraformaldehyde over a one hour period and held for an additional hour.

There is obtained 100 parts of a solid reaction product having a melting point between about 60° C. and 70° C., indicating unreacted trichlorophenol. On analysis, hexachlorophene is not recovered.

EXAMPLE 5

To a suitable reaction vessel are added 100 parts of substantially pure (99.5%) 2,4,5-trichlorophenol having a melting point range between 65° C. and 68° C. and 75 parts of acetic acid. The mixture is heated to 85° C. The temperature is increased to 95° C. for a period of about 30 minutes during which time period 75 parts of oleum or fuming sulfuric acid (20% $SO_3$) under agitation are added. Thereafter, 50 parts of concentrated sulfuric acid are introduced so as to further dilute the reaction mixture. To the latter are then slowly added 8.5 parts of paraformaldehyde over a one hour period. The temperature of the resultant mixture is held at about 90° C. for an additional one and one-half hours. On filtration directly from the concentrated acid medium, a crude hexachlorophenene is obtained and the acid medium is available for recovery of the acids therein.

The crude recovered hexachlorophene is next heated at 95° C. with an aqueous mixture of 2% of sodium carbonate and 5% sodium hydroxide to maintain the overall slurried mixture at a pH of 9.5 to form the mono-sodium salt of hexachlorophene therein. On cooling to room temperature, a substantially pure hexachlorophene salt precipitates and is separated from the mixture by filtration. The salt is digested at 95° C. in an acid solution to regenerate hexachlorophene which upon water washing and drying yields 96% of a white powdery hexachlorophene, having a melting point between 162° C. and 165° C.

Substituting formic acid for acetic acid in the above Example 5, hexachlorophene can also be obtained.

Advantageously, the process of the invention permits the utilization of crude trichlorophenol as a reactant in hexachlorophene manufacture and obviates the use of steam distillation to recover water-insoluble organic solvents, such as halogenated hydrocarbons, normally employed to initially dissolve the 2,4,5-trichlorophenol reactant. Additionally, the need to effect repeated recrystallization from solvents to recover desired hexachlorophene is obviated, since the latter is readily recovered in the process of the invention as a precipitate in an aqueous environment either as hexachlorophene, or the alkali metal salt thereof, in good yield and purity.

What is claimed is:

1. A process for preparing bis-(3,5,6-trichloro-2-hydroxyphenyl) methane which comprises the steps of: admixing 100 parts, by weight, of 2,4,5-trichlorophenol in from 25 to 100 parts, by weight, of an organic acidic medium selected from the group consisting of formic acid, acetic acid, propionic acid and mixtures of the same, condensing the latter 2,4,5-trichlorophenol mixture with from 8 to 9 parts, by weight, of a formaldehyde-yielding material selected from the group consisting of paraformaldehyde and formaldehyde in the presence of from 100 to 200 parts of a concentrated or fuming sulfuric acid condensing agent at a temperature ranging from about 80° C. to 120° C., and recovering hexachlorophene.

2. The process according to claim 1 wherein the aldehyde-yielding material is paraformaldehyde.

3. The process according to claim 1 wherein the trichlorophenol is admixed in acetic acid.

4. The process according to claim 1 wherein the trichlorophenol is admixed in formic acid.

5. The process according to claim 1 wherein the trichlorophenol is admixed in acetic anhydride.

6. The process according to claim 1 wherein 100 parts, by weight, of 2,4,5-trichlorophenol are admixed with 50 parts of acetic anhydride, acetic acid or mixtures of the same, and maintaining the temperature between about 85° C. and about 120° C., adding 150 parts of concentrated sulfuric acid thereto and adding to the resultant mixture 8.5 parts of a formaldehyde-yielding material.

7. The process according to claim 6 wherein the formaldehyde-yielding material is paraformaldehyde.

8. The process according to claim 6 wherein the trichlorophenol is admixed with formic acid.

9. The process according to claim 6 wherein the trichlorophenol is admixed with acetic acid.

10. The process according to claim 6 wherein the trichlorophenol is admixed with propionic acid.

References Cited
UNITED STATES PATENTS

| | | | |
|---|---|---|---|
| 1,707,181 | 3/1929 | Weiler et al. | 260—619 X |
| 2,616,932 | 11/1952 | Moyle et al. | 260—619 X |
| 2,812,365 | 11/1957 | Gump et al. | 260—619 X |

BERNARD HELFIN, Primary Examiner

N. P. MORGENSTERN, Assistant Examiner